Patented July 2, 1935

2,006,661

UNITED STATES PATENT OFFICE 2,006,661

PROCESS OF TREATING REGENERATED CELLULOSE ARTICLES

Julius Voss, Wiesbaden-Biebrich, Germany, assignor to Kalle & Co. Aktiengesellschaft, Wiesbaden-Biebrich, Germany, a corporation of Germany No Drawing. Application March 8, 1932, Serial No. 597,633. In Germany March 10, 1931

4 Claims. (Cl. 18—48)

This invention relates to regenerated cellulose materials and more particularly to a process of treating articles formed of regenerated cellulose for the purpose of reducing the swelling capacity or capacity for absorbing water.

Products or articles formed of regenerated cellulose which are obtained, for example, from cellulose solutions, such as viscose, cuprammonium, cellulose esters, etc., are characterized in that they possess a much greater capacity for water absorption than natural cellulose. For many uses this property is a serious limitation. For example, the ability of artificial threads formed of regenerated cellulose to withstand washing is considerably lower than that of cotton, and films of regenerated cellulose change their dimensions much more with changes in atmospheric humidity than paper films of corresponding size.

Various processes have already been proposed for overcoming these disadvantages, but of all the suggested methods only that described in the German Patent 416,796 is the best. However, even that method which contemplates subjecting products of regenerated cellulose to steam of a certain degree of saturation in an autoclave at definite temperatures is not entirely satisfactory and possesses undesirable features. In actual practice, it is extremely difficult to adhere to the exact working conditions in an industry and consequently serious difficulties are encountered.

I have found that the above-mentioned disadvantages and defects may be overcome and the swelling capacity or capacity for absorbing water of products formed of regenerated cellulose may be appreciably reduced by treating the regenerated cellulose products with organic solvents containing water at an elevated temperature, and preferably in an autoclave.

It is, therefore, an object of this invention to provide regenerated cellulose articles characterized in that the swelling capacity or capacity for absorbing water is appreciably reduced.

Another object of this invention is to provide a method of reducing the swelling capacity or capacity for absorbing water of products formed of regenerated cellulose which comprises treating the regenerated cellulose with organic solvents containing water at an elevated temperature, and preferably in an autoclave.

Other objects will appear from the following description and appended claims.

In accordance with the principles of the instant invention, regenerated cellulose products produced from cellulosic solutions, such as viscose, cuprammonium cellulose or cellulose esters, are subjected to a treatment whereby the swelling capacity or capacity for absorbing water is appreciably reduced. The process contemplates treating the regenerated cellulose articles with a liquid medium comprising an organic solvent containing water at an elevated temperature. After cooling, the film is dried.

The product of the method just described, when brought in contact with water, absorbs a quantity thereof which is considerably less than the quantity of water which the product would absorb if it were not treated in accordance with the instant invention.

As organic solvent constituents of the liquid medium with which the regenerated cellulose articles are treated, all organic solvents which are substantially neutral, completely or partially miscible with water or capable of being made miscible with water by the addition of small quantities of some other organic liquid and which solvents themselves have no action on the cellulose or have a slight softening action may be utilized. The simple alcohols, such as methyl alcohol, ethyl alcohol, isopropyl alcohol, dioxane, diacetone alcohol, monoethyl ether of glycol, may be mentioned as illustrative examples which have given satisfactory results. Glycerin and ethylene glycol are also suitable but the results produced from the use thereof are not quite as good as those secured when the substances previously mentioned are employed. Instead of a single solvent, a plurality thereof may be used. Likewise, mixtures of the previously-mentioned organic solvents with hydrocarbons or other derivatives, such as benzol, may be used if such mixtures are miscible to a certain extent with water.

As previously mentioned, the invention contemplates the use of an organic solvent containing water. The amount of water present in the organic solvent may vary within wide limits. In the preferred embodiment of the invention, the solvents are used which have a water content of from 10%–35%.

The treatment of the regenerated cellulose article in the organic solvent containing water is carried out at an elevated temperature. No precise elevated temperature is necessary for the successful operation of the process. However, I prefer, in view of the fact that the process is accelerated at relatively high temperatures to utilize a temperature in excess of 100° C.

The treatment may be effected in any suitable apparatus. I prefer, however, to carry out the process in an autoclave.

In order to more fully explain the nature of the instant invention, several illustrative examples are hereafter set forth. It is to be understood that these examples are not intended to limit the invention thereto but are merely to illustrate several specific embodiments which have given satisfactory results.

*Example I.*—A film of regenerated cellulose containing, for example, 16% glycerin and 10% water is heated for 1 hour with 85% ethyl alcohol in an autoclave to 106° C. After cooling, the film is dried.

The product resulting from this procedure when placed in water shows a water content, after the removal therefrom, of 44%. The film before the treatment just explained, when immersed in water, showed a water content of 62%.

*Example II.*—A film of regenerated cellulose free of glycerin and containing approximately 10% of water is heated to 106° C. for 1 hour with 85% alcohol, and after cooling, dried in any convenient and suitable manner.

The product resulting from this procedure, when immersed in water and removed therefrom, shows a water content of 39%, whereas the film prior to treatment, when immersed in water, showed a water content of 51%.

It is apparent that the treatments considerably decreased the swelling capacity or the capacity of absorbing water.

*Example III.*—A film of regenerated cellulose freed from glycerin, 1 square meter of which has a weight of 55 grams, is heated for 1 hour with ethyl alcohol of 65% strength in an autoclave to 106° C. and then dried. The film before the treatment with alcohol, when immersed in water, showed a water content of 52%.

The product resulting from this procedure when placed in water, shows a water content of only 42.5%. By the treatment of the cellulose with alcohol of 65% its capacity of absorbing water is considerably decreased.

*Example IV.*—A cellulose film containing glycerin is heated to 106° C. with dioxan containing 15% of water or with a solution of 625 cc. of ethyl alcohol or 88% strength, 300 cc. of benzene and 75 cc. of water. The film is then dried.

The treatment with aqueous dioxan or an aqueous mixture of alcohol and benzene considerably decreases the capacity of absorbing water.

Though the specific examples have been described in connection with films of regenerated cellulose, the invention is not restricted thereto. The principles of the instant invention are equally applicable to all types of products formed of regenerated cellulose with or without softeners and with or without modifying ingredients such as, for example, threads, films, tubes, bands, hollow articles, etc.

The results secured by the instant invention are certainly new and unobvious. It is indeed surprising that organic solvents containing water diminish the swelling capacity of products formed of regenerated cellulose, since this process is based on dehydration. It would be thought that the above-mentioned organic solvents would only produce such results when used in an anhydrous state. The contrary was, however, found when solvents of the type previously mentioned were used in the anhydrous state under the same conditions.

Since it is obvious that various changes and modifications may be made in the above description without departing from the nature or spirit thereof, this invention is not restricted thereto except as set forth in the appended claims.

I claim:

1. A process of reducing the swelling capacity of products formed of regenerated cellulose which comprises heating regenerated cellulose products submerged in a liquid composition comprising an alcohol of the type which is miscible with water and 10% to 35% water to a temperature of not less than 100° C. and thereafter drying the product.

2. A process of reducing the swelling capacity of products formed of regenerated cellulose which comprises heating regenerated cellulose products submerged in a liquid composition comprising methyl alcohol and 10% to 35% water to a temperature of not less than 100° C. and thereafter drying the product.

3. A process of reducing the swelling capacity of products formed of regenerated cellulose which comprises heating regenerated cellulose products submerged in a liquid composition comprising ethyl alcohol and 10% to 35% water to a temperature of not less than 100° C. and thereafter drying the product.

4. A process of reducing the swelling capacity of products formed of regenerated cellulose which comprises heating regenerated cellulose products submerged in a liquid composition comprising monoethyl ether of glycol and 10% to 35% water to a temperature of not less than 100° C. and thereafter drying the product.

JULIUS VOSS.